United States Patent
Grace et al.

(10) Patent No.: US 6,488,506 B2
(45) Date of Patent: Dec. 3, 2002

(54) TRAINING AID FOR APPLICATION OF FALSE NAILS

(76) Inventors: John Grace, 113 Lodge La., Grays, Essex (GB), RM17 5SF; David Simmons, Peacocks Farm, Wickhambrook, Suffolk (GB), CB8 8PX ( * ) Notice: Subject to any disclaimer, the term of this patent is extended or adjusted under 35 U.S.C. 154(b) by 0 days.

(21) Appl. No.: 09/091,807

(22) PCT Filed: Oct. 30, 1997

(86) PCT No.: PCT/GB97/02982

§ 371 (c)(1),
(2), (4) Date: Jun. 22, 1998

(87) PCT Pub. No.: WO98/20474

PCT Pub. Date: May 14, 1998

(65) Prior Publication Data

US 2002/0127520 A1 Sep. 12, 2002

(30) Foreign Application Priority Data

Nov. 1, 1996 (GB) .............................................. 9622770

(51) Int. Cl.[7] .............................................. G09B 19/00
(52) U.S. Cl. ............................ 434/100; 132/73; 602/22; 623/64
(58) Field of Search ........................... 434/94, 274, 100; 132/73, 73.5; 602/22; 623/64, 21.11, 21.5, 21.9

(56) References Cited

U.S. PATENT DOCUMENTS

| 3,037,514 A | * | 6/1962 | Lappe ......................... 132/73 |
|---|---|---|---|
| 3,188,753 A | | 6/1965 | Lovercheck |
| 3,277,900 A | * | 10/1966 | Lappe ......................... 132/73 |
| 3,502,088 A | * | 3/1970 | Jarby ......................... 132/73 |
| 4,332,570 A | | 6/1982 | Getty |
| 4,361,160 A | * | 11/1982 | Bryce ......................... 132/73 |
| 4,403,442 A | | 9/1983 | Blanco et al. |
| 4,466,800 A | | 8/1984 | Breiden |
| 4,671,305 A | | 6/1987 | Mann |
| 4,944,758 A | | 7/1990 | Bekki et al. |
| 4,974,610 A | * | 12/1990 | Orsini ......................... 132/73 |
| 5,060,678 A | * | 10/1991 | Bauman et al. ............. 132/200 |
| 5,782,379 A | * | 7/1998 | Traub ......................... 221/93 |
| 5,901,714 A | * | 5/1999 | Benkart ...................... 132/285 |
| 5,904,149 A | * | 5/1999 | Ruhl et al. ................... 132/73 |

FOREIGN PATENT DOCUMENTS

| EP | 0045818 | 2/1982 |
|---|---|---|
| EP | 05161667 | 6/1993 |

OTHER PUBLICATIONS

Caliven, "le Testamodelle . . . ", Catologo 97, www.globe-life.com.

* cited by examiner

*Primary Examiner*—Derris H. Banks
*Assistant Examiner*—Urszula M Cegielnik
(74) *Attorney, Agent, or Firm*—Baker & McKenzie

(57) ABSTRACT

A device for use in training in the treatment of finger or toe nails, comprises an artificial digit (2) having a nail (4) removably mounted thereon. The nail may be attached by a screw (18), a ratchet arrangement, or by embedding it in a resilient layer on the surface of the digit.

4 Claims, 4 Drawing Sheets

Fig 9
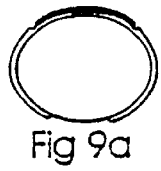
Fig 9a
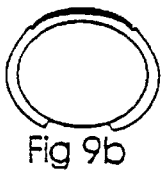
Fig 9b
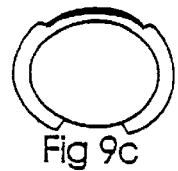
Fig 9c
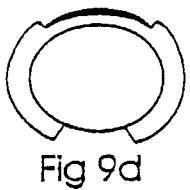
Fig 9d
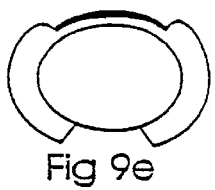
Fig 9e
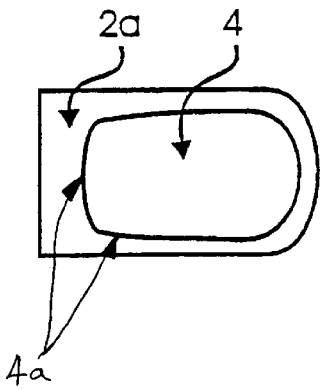
Fig 10a
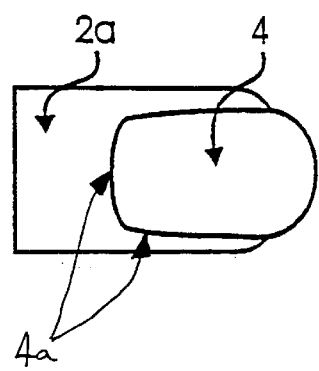
Fig 10b
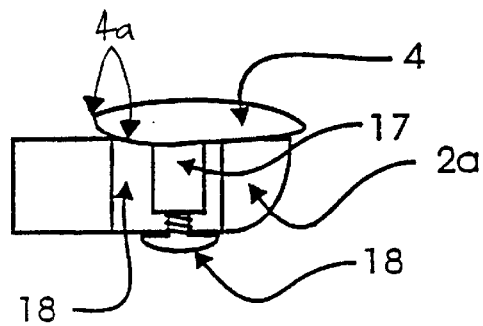
Fig 11

TRAINING AID FOR APPLICATION OF FALSE NAILS

FIELD OF THE INVENTION

This invention relates to a device for use in training in the treatment of finger or toe nails, for example in the application of false nails.

BACKGROUND OF THE INVENTION

The application of false nails is an established cosmetic process involving attaching the false nails by means of adhesive to the natural nail, and then shaping the nail to give the effect of perfectly manicured natural nails. A high degree of skill is required in applying and shaping a set of nails quickly and safely while achieving a satisfactory appearance. The adhesives used in attaching the false nails can cause discomfort if allowed to contact bare skin, while excessive abrasion in the preparation of the natural nail to receive the false nail can result in exposure of the underlying nail bed, causing the customer pain, even before contact by the adhesive. It can therefore take many weeks of training before an operator becomes suitably profident, particularly since the risk of damage to the customer by an unskilled operator deters volunteers from assisting in training.

The use of mannequin hands has not hereinbefore proved useful in assisting in training of operators, since it is impossible with a solid hand to simulate the typical feel of a natural hand and the variety of different types of natural nail and shapes and sizes of finger which might be encountered in practice. Some natural nails are readily accessible, while others may be recessed deeply in the surrounding flesh. The trainee must learn to handle all types of fingers safely without risk of damage to surrounding flesh or to the nail bed. While articulated fingers, for example as found in the wooden hands used as artists' may help to simulate the feel of the natural hand, such models do not usually include nails, or have a correct fleshy feel.

U.S, Pat. 4,403,442 teaches a novelty device for dolls that simulates the growth of fingernails and toenails through the use of lengths of extendable nail material stored within the body of the doll. This device permits a child to play by manicuring and painting the exposed portions of the nail material. Subsequently each length of nail material can be extended longitudinally to enable the used portion to be trimmed off, thereby exposing a new portion of the nail material for the child to play with. It also envisages that such doll hands and attached arm portions could be made of life size so that they are capable of receiving the hands and arms of a first child, thereby affording her playmate the opportunity to give her a manicure without the inherent dangers to the child of trimming, cutting and polishing. However, it does not teach how a child could safely insert her hands and arms into the device which is filled with the lengths of nail material and associated electrical motors operating drive rollers to extend the lengths of nail material. Whilst the concepts taught by U.S. Pat. No. 4,403,442 provide possibilities for children to play with expendable nail material supported by artificial digits, its features are unsuitable for use as a serious training device by adults. Each length of extendable nail material must essentially pass with working clearance under the cuticle and then be received within nail tracks extending the length of the nail. Any attempt by a trainee to apply adhesive to the exposed nail surface would inevitably introduce the adhesive into the small clearances between the extendable nail material and the nail tracks thereby permanently securing the extendable nail material to the doll's fingers. Similarly, when the surface of the nail material is abraded prior to application of a false nail, fragments of nail material and the abrasive would collect in the gap between the cuticle and the extendable nail material and would absorb the adhesive thereby forming a blockage which will eventually lock the extendable nail material to the doll's finger. The use of fixed nail tracks also does not enable training to take place on nails of different shapes or having different degrees of bedding in the finger.

SUMMARY OF THE INVENTION

According to the invention a nail treatment training device has an artificial nail which is mounted against an artificial digit tip and has an edge that is seated against the artificial digit tip to define the junction between the nail and the digit.

Preferably at least part of the digit tip is formed from a resiliently compressible material to simulate a natural digit tip. In this event the mounting of the artificial nail may permit adjustment of the depth to which the edge is seated in the digit tip.

The mounting of the artificial nail may permit longitudinal adjustment of the nail relative to the digit tip and may permit adjustment of the depth to which the edge is seated in the digit tip. The digit tip preferably defines a resilient recess in which the nail is mounted.

The artificial digit tip may comprise a replaceable surface layer carried by the substrate. In this event the replaceable surface layer may either be a segmented preformed skin folded over and attached to the substrate, or a resilient sheath engaged over the substrate.

The nail is preferably secured to a member which extends through the replaceable surface layer and is attached to the substrate. In this event the member may be attached to the substrate by a device which permits adjustment of the depth to which edge is seated in the replaceable surface layer. This device may either comprise a threaded connection reacting between the member and the substrate, or a ratchet means operable between the member and the substrate.

The device may comprise an artificial hand or foot having five artificial digits each having its tip provided with an artificial nail. The digits may be articulatedly joined to a main or palm section of the hand or foot, and the digits may be provided with articulated joints between the segments thereof. The joints are preferably arranged to permit a degree of twisting of one segment of the digit relative to another, and more preferably the degree of twisting is such as to permit each digit to twist relative to the main section by up to 30 degrees.

The tip of the digit on which the nail is mounted may be detachably connected to the remainder of the digit so as to be replaceable.

In one embodiment of the invention, at least the tip of the digit is provided with a resiliently compressible surface, the nail being adjustably mounted whereby the nail may be positioned at a selected height relative to the surface. The resiliently compressible surface may be provided by way of a replaceable surface layer on a rigid, or less compressible, substrate. Preferably, the resilient material will be chosen to have, as nearly as possible, the same consistency, feel and properties as natural flesh.

The nail may be attached to the tip of the digit by a screw attachment, for example by providing the nail on the underside thereof with a threaded socket into which a screw is engaged through a hole through the digit tip, thereby securing the nail in such a manner that the compression of the nail in the resilient layer may be adjusted to simulate different types of finger, for example more or less fleshy fingers and nails more or less deeply bedded in the flesh. Alternatively, the nail may be provided on the underside thereof with ratchet means engageable in an aperture in the digit tip whereby the nail may be positioned at a predetermined height relative the to the surface. Longitudinal adjustment of the nail relative to the digit may be provided for.

In yet another embodiment, the nail is mounted on a resilient sheath engageable over the tip of the digit, the sheath simulating skin and the compressible surface of the flesh of the digit.

Different thicknesses of resilient surface layer may be used to simulate different degrees of fleshiness of the digits.

Different sizes and shapes of nails may be fitted selectively to provide the trainee with experience of a wide range of different nail types. these may be, for example, large or small, symmetrical or asymmetrical.

In a still further embodiment of the invention, the tip is provided with a resilient recess into which the nail is pressed.

The hand or foot is suitably mounted on a stand in such a manner as to permit a range of movements which simulates the typical movements of a natural hand or foot during treatment. This may be achieved by, for example, ball-and-socket mountings, sliding mountings or the like.

The device of the invention provides an accurate representation of a client's hand, with nails which can be adjusted to simulate those likely to be encountered by the operator in every day practice, so that the operator can be rapidly trained to best practice without dependence on volunteers and without risk of damage to clients' hands. After use, the resilient surface layer and the nail will typically be removed from the digit tip and replaced with fresh materials for the next training exercise.

It will be appreciated that both left and right hands (or indeed feet) can be used to give the trainee the most realistic training.

BRIEF DESCRIPTION OF THE DRAWINGS

In the drawings, which illustrate exemplary embodiments of the different aspects of the invention:

FIGS. 9a to 9e are cross-sectional views of the end of the finger tip of FIG. 6, when assembled, showing the effects of progressively increasing the thickness of the resilient surface layer simulating the skin;

FIGS. 10a and 10b are top plan views of the finger tip showing the variability of the positioning of the nail which can be achieved; and FIG. 11 is a longitudinal cross-sectional view of the finger tip showing how the variability can be achieved.

DETAILED DESCRIPTION OF THE ILLUSTRATED EMBODIMENTS

Figure 1:
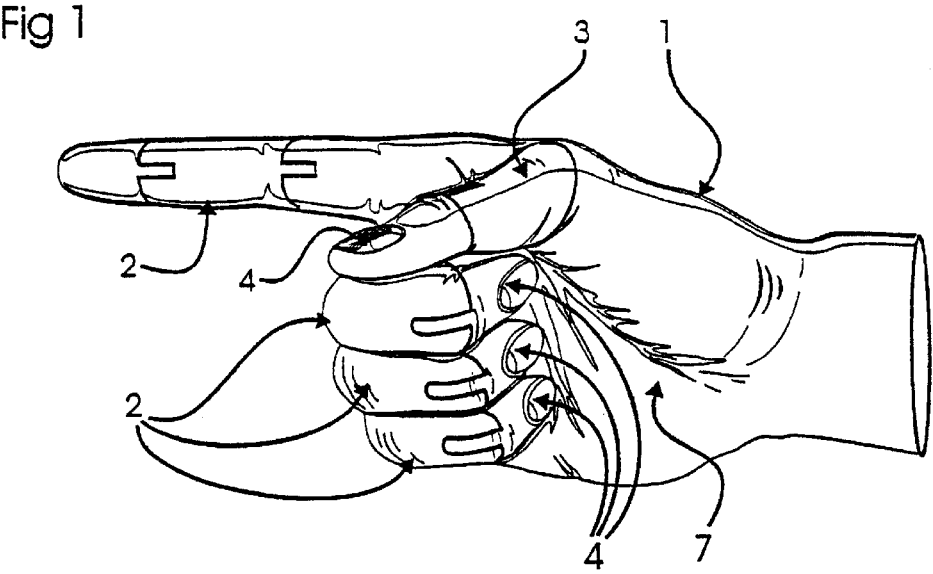
FIG. 1 is a perspective view of a training hand, illustrating the arrangement of the finger joints.
Figure 2A:
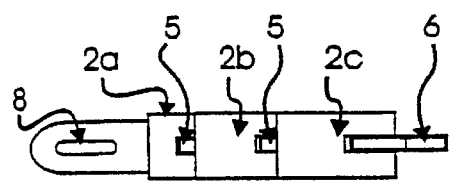
FIGS. 2a and 2b are respectively top plan and side elevational views of one of the fingers of the hand of FIG. 1.
Figure 2B:
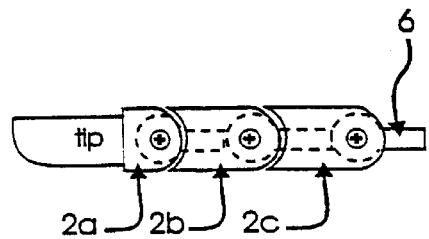
Figure 3A:
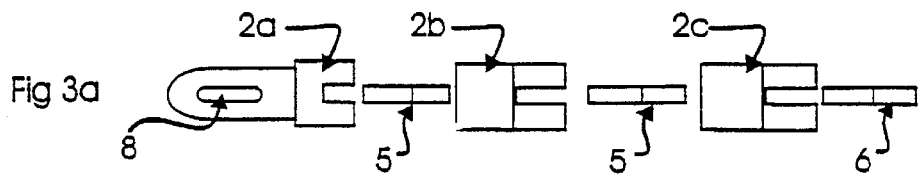
FIGS. 3a and 3b are corresponding exploded views of the finger of FIGS. 2a and 2b.
Figure 3B:
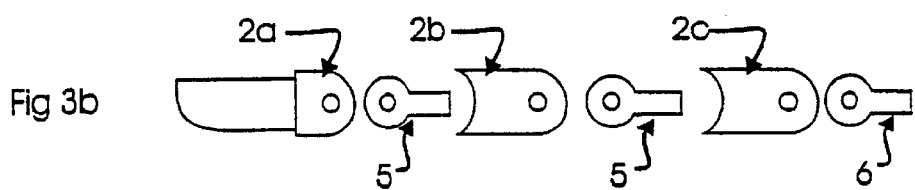

Referring first to FIG. 1, the hand 1 is designed to simulate as closely as possible the movement, flexibility and feel of a natural hand, and is provided with jointed fingers 2 and thumb 3 arranged to have the same range and directions of movement of a natural hand. Each digit 2 and 3 has a tip portion in which is removably mounted a nail 4, as hereinafter described. FIGS. 2 and 3 illustrate the construction of the finger joints. It will be seen that each finger section 2a, 2b, 2c is linked to the next by means of a simple rotary joint incorporating a jointing ligament 5 formed of a relatively stiff material permitting rotation substantially only in a single plane. A third ligament 6 (the second in the case of the thumb) joins the finger to the palm 7 (see FIG. 1), and is formed of a more flexible material, such as polyethylene, permitting a degree of rotation of the finger around the longitudinal axis thereof. A total rotation of about 30 degrees is sufficient to simulate that available in a typical natural finger. The finger tip 2a is of reduced thickness over the greater part of its length to accommodate a surface layer of a resilient material, as hereinafter described. A slot 8 therethrough is provided for the fitting of the finger nail, also as hereinafter described.

Figure 4:
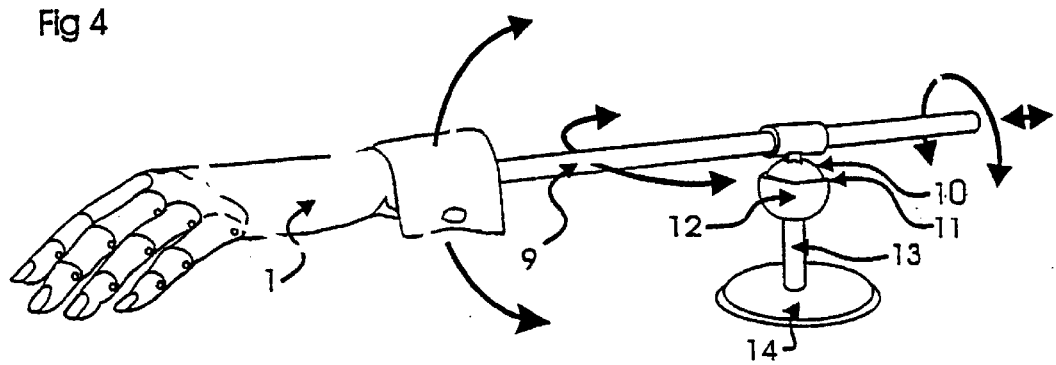
FIG. 4 is a perspective view of the hand of FIG. 1 when mounted for use.

FIG. 4 illustrates the mounting of the practice hand 1 for use in training. The hand 1 is mounted on a shaft 9, on which is slidably mounted in turn the ball 10 of a ball-and-socket joint 11, the socket 12 of the joint 11 being provided on a stand 13 which can be attached to a horizontal surface by means of its flat base 14. The arrangement illustrated permits the hand four degrees of freedom of movement, as illustrated by the curved arrows in the Figure, namely vertical rotation, forwards and backwards movement, horizontal rotation about the stand 13, and axial rotation about the shaft 9. This provides a good simulation of the movement of the client's hand, in practice.

Figure 5A:
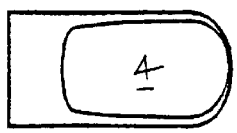
FIGS. 5a and 5b are views of two finger tips showing the range of different types which have to be accommodated by the device of the invention.
Figure 5B:
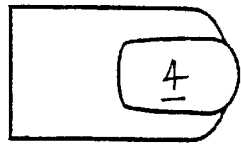

FIGS. 5a and 5b illustrate the use of the different sizes of nail 4 likely to be encountered by the operator in practice. The finger tip shown in FIG. 5a has a relatively large nail fitted thereto, while that shown in FIG. 5b is at the other extreme of the range, having a small nail. It is also possible to replace the finger tip with a larger or smaller sized finger tip to simulate any tip within the extremes of the ranges likely to be encountered, in practice. However, variations in fleshiness will typically be achieved by replacing the resilient surface layer (skin) with a thicker or thinner material as desired.

Figure 6:
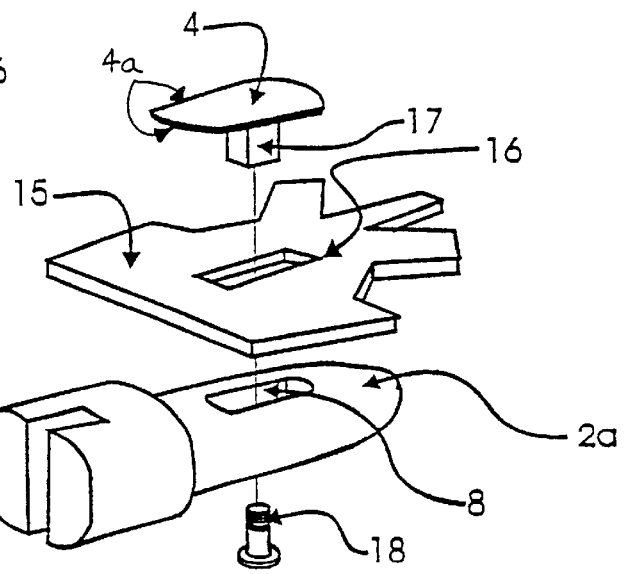
FIG. 6 is an exploded perspective view of a finger tip from the device of the invention.
Figure 7:
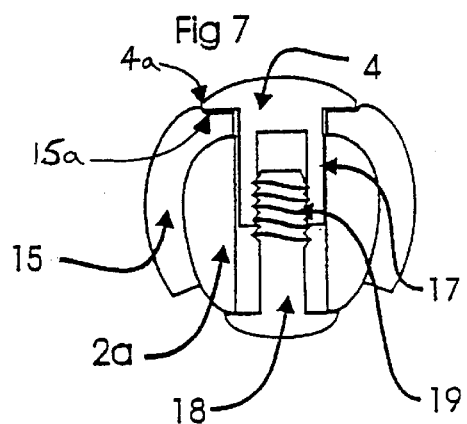
FIG. 7 is a cross-sectional view of the finger tip of FIG. 6 when assembled, showing simulation of a nail with a shallow seat.
Figure 8:
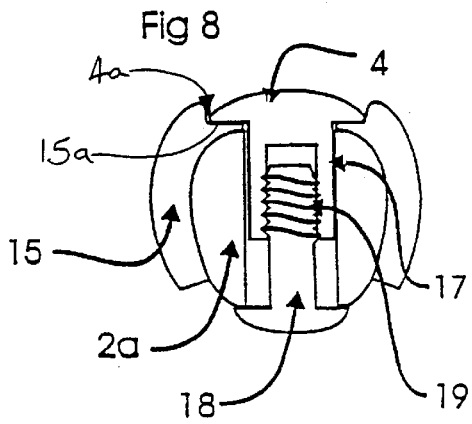
FIG. 8 is a view corresponding to that of FIG. 7, but simulating a nail with a deep seat.

FIG. 6 illustrates one preferred construction of the finger tip 2a, having both a replaceable nail 4 with an edge 4a, and replaceable underlying surface layer or skin 15 formed of a resilient expanded plastics or rubber material, suitably with a layer of adhesive thereon to permit attachment of the skin to the finger tip 2a. The skin 15 is preformed with a segmented shape such that it can be folded over the finger tip, following the shape thereof in such a manner that the segments closely abut to form a continuous layer with neither overlapping portions nor gaps between the segments. The skin 15 can have any of a range of different thicknesses to simulate different types of fingers and nail beds. A slot 16 in the skin 15 corresponds in size and position to the slot 8 in the finger tip 2a. The nail 4 is suitably formed of a plastics material which has similar mechanical properties and feel to a natural nail, for example acrylonitrile butadiene styrene (ABS). A rectangular section socket member 17 extends from the underside of the nail 4, the member 17 having a width such as to provide a sliding fit in the slot 8, but a length which is less than that of the slot, so as to permit longitudinal adjustment of the nail relative to the finger tip. A screw 18 engages in a threaded socket 19 (FIGS. 7 and 8) in the member 17 to secure the nail 4 in place, and to permit vertical adjustment in the slot 8 so as to vary the degree of embedding in the underlying skin, as may be seen from FIGS. 7 and 8. FIG. 7 shows the simulation of a shallow seating of nail 4 with its edge 4a seated against a resilient recess 15a in the relatively thick skin layer 15 to define the junction between the nail 4 and the skin layer 15, while FIG. 8 shows that, by screwing the nail 4 down further, a deep seat can be simulated by pressing the edge 4a harder against the skin layer 15. FIGS. 9a to 9e show the effect of varying the thickness of the skin 15 to achieve different types of finger tip 3, from a firm, thin finger tip with a shallowly seated nail in FIG. 9a to a relatively fleshy finger tip with a deeply seated nail, as shown in FIG. 9e.

The greater length of the slot 8 when compared to that of the member 17 permits longitudinal adjustment, as illustrated in FIGS. 10a and 10b. FIG. 10a shows a finger tip where the nail 4 is seated rearwardly so as to lie wholly within the finger tip area, in plan, while in FIG. 10b, the nail 4 is seated forwardly to its fullest extent, so as to project forwardly of the finger tip. FIG. 11 is a sectional side elevation illustrating the way in which the longitudinal adjustment is achieved.

While the device of the invention is usable for training in a range of nail treatments, both for finger and toe nails, it is particularly suited to the training of artificial nail technicians, since the removable nails permit a wide range of natural nails to be simulated, for example chewed or split nails, to which artificial nails are to be attached, and then shaped to suit the client'fingers. The techniques involved in preparing the natural nail to receive the artificial nail, and then in subsequent shaping and finishing of the artificial nail, carry a risk of damage to the client's finger if not carried out with sufficient care. The removable skin layer on the finger will immediately reveal if such care has not been exercised by the trainee.

What is claimed is:

1. A nail training device, comprising:

at least one artificial digit tip;

a resilient layer covering at least a portion of the at least one artificial digit tip;

a nail, the nail simulating a natural nail; and a mounting mechanism for removably mounting the nail on the resilient layer of the at least one artificial digit tip, wherein the resilient layer is compressible and the mounting mechanism is operable to permit a depth to which the nail is embedded into the resilient layer to be selectively varied.

2. The nail training device as set forth in claim 1, wherein a junction is formed between an edge of the nail and the resilient layer when the nail is embedded into the resilient layer.

3. A nail training device, comprising:

at least one artificial digit tip;

a resilient layer covering at least a portion of the at least one artificial digit tip;

a nail, the nail simulating a natural nail; and a mounting mechanism removably mounting the nail on the resilient layer of the at least one artificial digit tip, wherein the resilient layer is compressible and the mounting mechanism is operable to permit a depth to which the nail is embedded into the resilient layer to be selectively varied.

4. The nail training device as set forth in claim 3, wherein a junction is formed between an edge of the nail and the resilient layer when the nail is embedded into the resilient layer.

* * * * *